United States Patent
Mellein

(10) Patent No.: US 8,706,046 B2
(45) Date of Patent: Apr. 22, 2014

(54) METHOD AND DEVICE FOR TRANSMITTER CALIBRATION

(75) Inventor: Heinz Mellein, Haar (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 1571 days.

(21) Appl. No.: 12/256,982

(22) Filed: Oct. 23, 2008

(65) Prior Publication Data

US 2009/0110041 A1 Apr. 30, 2009

(30) Foreign Application Priority Data

Oct. 25, 2007 (EP) .................................... 07020946

(51) Int. Cl.
*H04B 17/00* (2006.01)
*H04B 3/46* (2006.01)
*H04Q 1/20* (2006.01)

(52) U.S. Cl.
USPC ................... 455/67.14; 455/67.11; 375/224

(58) Field of Classification Search
USPC ................... 455/67.11, 67.12, 67.14, 68, 69
See application file for complete search history.

(56) References Cited

U.S. PATENT DOCUMENTS

| | | | | |
|---|---|---|---|---|
| 5,465,399 | A * | 11/1995 | Oberholtzer et al. | 455/69 |
| 6,173,162 | B1 * | 1/2001 | Dahlman et al. | 455/69 |
| 6,453,472 | B1 * | 9/2002 | Leano et al. | 725/111 |
| 6,463,290 | B1 * | 10/2002 | Stilp et al. | 455/456.1 |
| 6,832,075 | B1 * | 12/2004 | Henry, Jr. | 455/67.14 |
| 7,477,877 | B2 * | 1/2009 | Bednasz et al. | 455/67.14 |
| 2004/0174845 | A1 * | 9/2004 | Koo et al. | 370/328 |
| 2006/0240815 | A1 | 10/2006 | Shim et al. | |
| 2007/0216880 | A1 * | 9/2007 | Qi et al. | 355/53 |
| 2008/0182610 | A1 * | 7/2008 | Cavalli et al. | 455/522 |
| 2008/0287078 | A1 * | 11/2008 | Kim et al. | 455/127.1 |

FOREIGN PATENT DOCUMENTS

CA 2 581 321 A1 4/2006

OTHER PUBLICATIONS

Mahmoud et al., "Initial Ranging for WiMAX (802.16e) OFDMA," Military Communications Conference, MILCOM, Oct. 23-25, 2006, 8 pages.
Long et al., "Ranging Schemes in HFC Networks and its Embedded Implementation," Systems and Control in Aerospace and Astronautics, 1st International Symposium on Harbin, China, Jan. 19-21, 2006, pp. 1061-1064.
Search Report in EP Application No. 07 02 0946 dated Aug. 20, 2008, 3 pages.

* cited by examiner

*Primary Examiner* — Yuwen Pan
*Assistant Examiner* — Ayodeji Ayotunde
(74) *Attorney, Agent, or Firm* — Marshall, Gerstein & Borun LLP

(57) ABSTRACT

A device for calibrating a digital communication station uses an initial ranging procedure for measuring channel parameters in a communication channel. The device comprises a communication emulator, a measuring device, and a calibrator. The communication emulator transmits a signal to the communication station which transfers the communication station into an initial ranging mode. The measuring device measures parameters of the signal transmitted by the communication station during an initial ranging cycle. From these measurements the calibrator calculates the necessary calibration adjustments to the communication station and adjusts it accordingly.

21 Claims, 4 Drawing Sheets

METHOD AND DEVICE FOR TRANSMITTER CALIBRATION

CROSS-REFERENCE TO RELATED APPLICATION

Convention priority based on European Patent Application No. EP 07 0020946.5 filed Oct. 25, 2007, the entire disclosure of which is incorporated by reference herein, is claimed.

BACKGROUND OF THE INVENTION

1. Field of the Invention

The invention relates to calibrating a digital communication station, especially a WiMax mobile communication station.

2. Related Technology

During the last years the calibration of mobile communication stations during production is becoming increasingly important. The customary approach is setting up a communication connection with the device under test and transmitting a series of test data streams through the device while measuring the transmissions. With rising radiofrequencies in modern communication systems the calibration though is becoming more and more challenging. While the measuring equipment is readily available the means for emulating a communication connection with the device under test are expensive if at all available.

For example in US 2006/0240815 A1 a device and a method for calibrating mobile communication terminals is shown. A base station simulator communicates with the mobile communication terminal under test while a process control PC measures calibration relevant parameters.

SUMMARY OF THE INVENTION

Accordingly, the invention provides a method and a device for calibrating communication stations without emulating a complete communication connection with the communication station, which requires only low cost components.

The invention provides a method for calibrating a digital communication station, which uses an initial ranging procedure for measuring channel parameters in a communication channel, comprising: transmitting a signal to the communication station, which transfers the communication station into an initial ranging mode; measuring parameters of the signal transmitted by the communication station during an initial ranging cycle; calculating necessary calibration adjustments to the communication station, and adjusting the communication station.

The invention also provides a device for calibrating a digital communication station, which uses an initial ranging procedure for measuring channel parameters in a communication channel, comprising: a communication emulator, measuring device, and calibrator, wherein: the communication emulator transmits a signal to the communication station which transfers the communication station into an initial ranging mode, the measuring device measure parameters of the signal transmitted by the communication station during an initial ranging cycle, the calibrator calculates the necessary calibration adjustments to the communication station, and the calibrator adjust the communication station accordingly.

The invention calibrates a digital communication station, which uses an initial ranging procedure for measuring channel parameters in a communication channel. The inventive device comprises a communication emulator, a measuring device, and a calibrator. The communication emulator transmits a signal to the communication station that transfers the communication station into the initial ranging mode. The measuring device measure parameters of the signal transmitted by the communication station during an initial ranging cycle. From these measurements the calibrator calculates the necessary calibration adjustments to the communication station and adjust it accordingly. This results in an easy and efficient way to calibrate the communication station. The emulation of an entire communication session is not necessary.

Preferably, the calibrator triggers the measuring device to repeat the calibration, if specified requirements are not met by the communication station after at least one calibration attempt. After a predefined number of calibration attempts the communication station is discarded by the calibrator. Therefore the defective communication station is clearly identified and discarded. Onetime calibration errors are compensated by repeating the calibration process.

The parameters of the signal transmitted by the communication station and measured by the measuring device are preferably at least one of the signal power, the signal timing, and the signal frequency. All relevant parameters of the signal can be measured and taken into account for calibrating the communication station.

After transmitting a signal to the communication station that transfers the communication station into the initial ranging mode the communication emulator preferably transmits no response to the signals transmitted by the communication station causing the communication station to preferably perform an entire initial ranging cycle, gradually increasing its transmitting power. Without the need for actual communication with the communication station it can therefore be triggered to transmit a defined communication message enabling a calibration measurement.

Preferably the communication station is a mobile communication station. Using the invention it is possible to calibrate mobile communication stations without any external interface controlling the communication station.

The communication station is preferably a WiMax or UMTS or GSM communication station. The invention is capable of calibrating a wide variety of communication stations.

Preferably the signal transmitted to the communication station by the communication emulator that transfers the communication station into the initial ranging mode includes communication channel information setting at least one channel for the communication station to use for the initial ranging cycle. This enables the calibration of specific channels used by the communication station.

The channel information preferably includes at least one of a code, a frequency, and a timing. The definition of the channel to be calibrated is therefore possible for a wide variety of modulation schemes and protocol types.

Preferably the calibrator triggers the measuring device to repeat the calibration for a plurality of different channels. Therefore more than one channel up to all the channels used by the communication station can be calibrated in one procedure.

The signal transmitted by the communication emulator to the communication station that transfers the communication station into the initial ranging mode preferably controls parameters of the initial ranging mode. Therefore the duration, the number of transmissions and further parameters of the initial ranging cycle can be set.

Preferably the device further comprises a radio frequency coupling connecting the communication station with the measuring device and the communication emulator.

BRIEF DESCRIPTION OF THE DRAWINGS

An exemplary embodiment of the invention is now further explained with respect to the drawings, in which.

DETAILED DESCRIPTION

Figure 1:
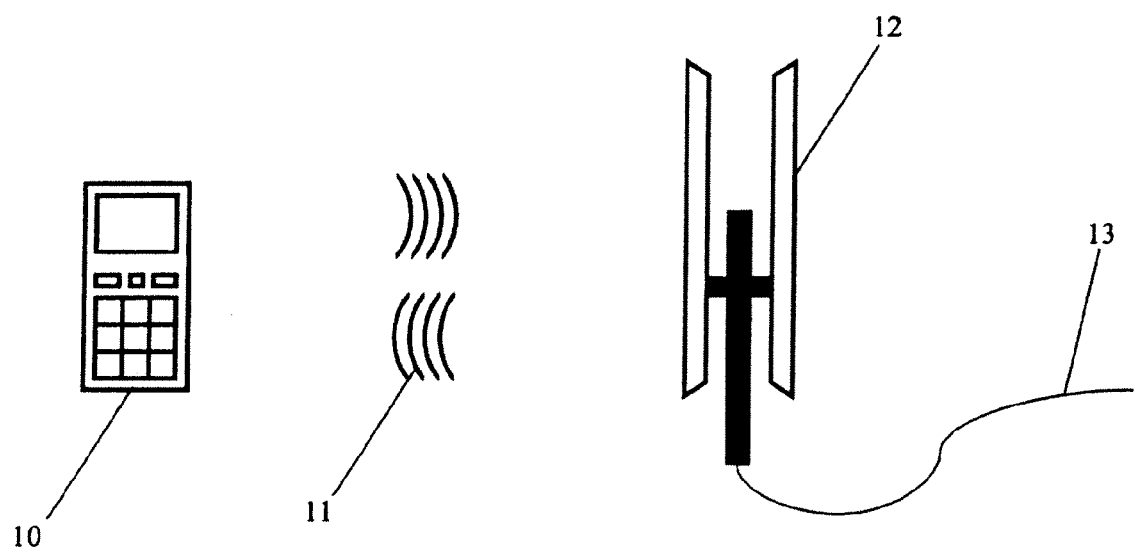
FIG. 1 shows an exemplary communication setup.

The communication setup of FIG. 1 is described below. The function of an initial ranging procedure is described along FIGS. 2 and 3. The function of the inventive device is illustrated in FIG. 4. Similar entities and reference numbers in different figures have been partially omitted.

FIG. 1 shows an exemplary communication setup. A communication station 10 is connected by a wireless interface 11 to a base station 12. The base station 12 is connected to a communication network 13. The base station 12 continuously transmits a signal indicating a range of channels to be used by communication stations 10 to form an initial ranging cycle. When initially switched on the communication station 10 receives this signal. A channel out of the range of channels offered by the base station 12 is randomly selected by the communication station 10.

The communication station 10 transmits a signal on this channel indicating its wish for access. In case the base station 12 answers communication between the communication station 10 and the base station 12 commences. In case the communication station 10 does not receive an answer from the base station 12 the communication station 10 repeats the signal with increased power in order to achieve communication with the base station 12. The communication station 10 continues repeating the signal until either a predefined number of repetitions has passed or the base station 12 has answered. In one preferred embodiment the base station 12 transmits the parameters of this initial ranging cycle along with the initial signal indicating possible channels for the ranging procedure.

Figure 2:
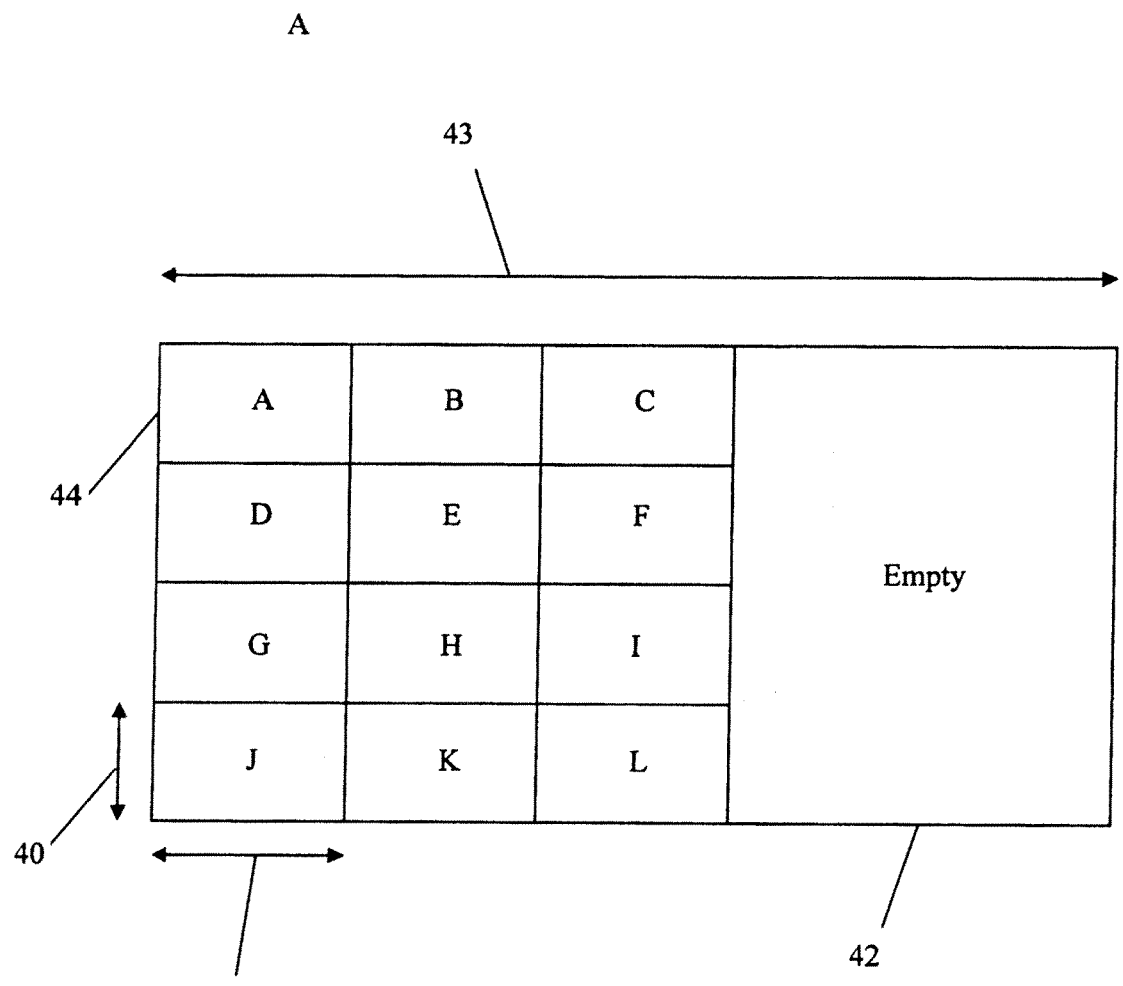
FIG. 2 shows the channel space of an exemplary communication system.

FIG. 2 shows the channel space of an exemplary communication system. A certain division of the available channels in the communication system is allocated for the initial ranging process. The ranging request allocation 43 is the entirety of the ranging requests opportunities 44 and a non-allocated area 42. A certain number of sub channels 40 and symbols 41 form every single ranging request opportunity 44. The base station 12 continuously transmits a signal indicating a plurality of ranging requests opportunities 44 for communication stations 10 to use performing an initial ranging cycle. It is necessary to provide a plurality of ranging requests opportunities 44 since the communication stations 10 have no knowledge of each other and therefore cannot consider a possible transmission by another communication station 10. By providing a plurality of ranging requests opportunities 44 the probability of a ranging request collision is minimized.

Figure 3:
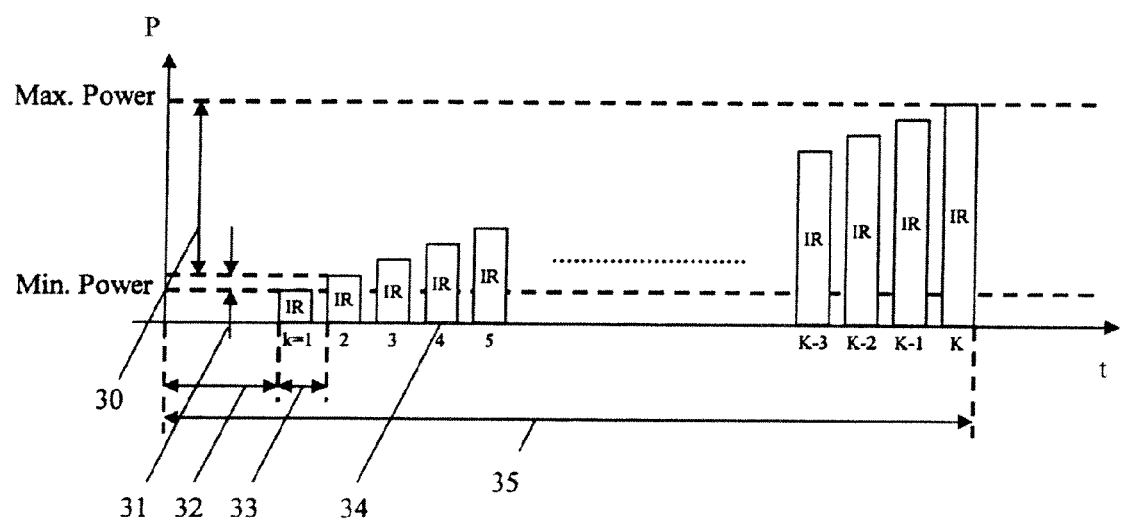
FIG. 3 shows a timing diagram of an exemplary initial ranging cycle of a communication station.
Figure 4:
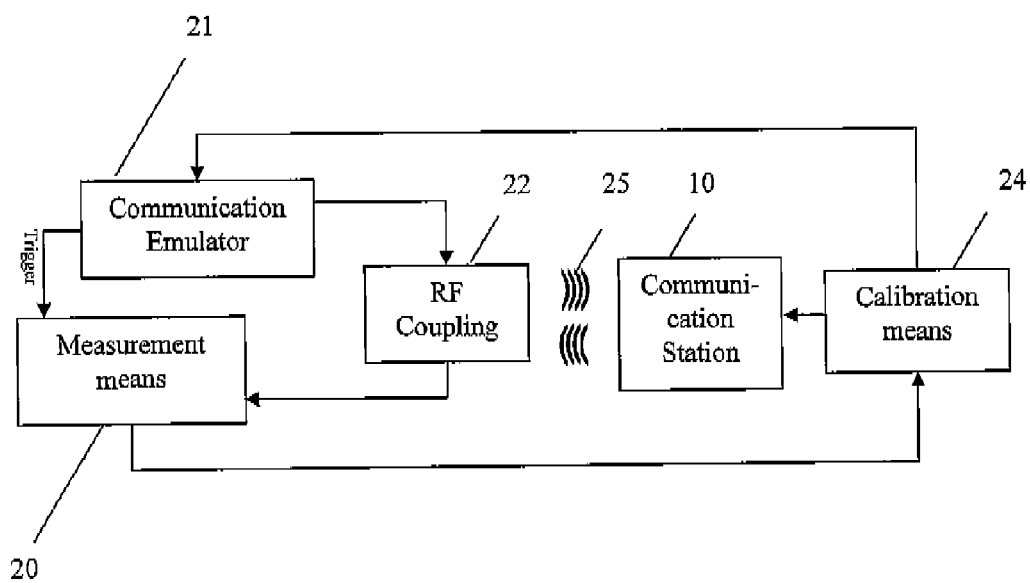
FIG. 4 shows a block diagram of an exemplary embodiment of the inventive device.

FIG. 3 shows a timing diagram of an exemplary initial ranging cycle of a communication station. As described with reference to FIG. 1 the communication station 10 begins transmitting initial ranging requests 34 as soon as it is switched on and has received the signal indicating the ranging request opportunities 44 from the base station 12 and a predefined amount of time 32 has passed. The communication station 10 begins transmitting the first initial ranging request 34 with a minimal transmission power. If it does not receive an answer from the base station 12 it increases the transmission power by a predefined amount 31 and repeats the transmission of the initial ranging request 34 after a predefined amount of time 33. After a predefined number of the attempts the communication station 10 has reached the maximum transmission power and stops transmitting initial ranging requests 34. The entire initial ranging request cycle requires a predefined amount time 35.

FIG. 4 shows a block diagram of an exemplary embodiment of the inventive device. The communication station 10 is the device under test (DUT) in the calibration setup. It is connected to a radiofrequency coupling 22 via a wireless interface 25. The radiofrequency coupling 22 is connected to measuring device 20 and a communication emulator 21. The communication emulator 21 is connected to the measuring device 20. Additionally the communication station 10 is connected to calibrator 24. The communication emulator 21 is connected to the calibrator 24. The measuring device 20 is also connected to the calibrator 24.

The communication emulator 21 generates a signal equivalent to the signal continuously transmitted by the base station 12 indicating allocated initial ranging opportunities 44. In order to calibrate a specific channel only one initial ranging opportunity 44 is transmitted. The generated signal is transmitted to the radiofrequency coupling 22. The radiofrequency coupling 22 transforms the signal into a wireless signal and transmits it to the communication station 10 through the wireless interface 25. The switched on communication station 10 receives the signal containing parameters specifying the initial ranging cycle. The communication station 10 begins transmitting initial ranging requests 34. Since it receives no answer it completes the initial ranging request cycle.

The signal is transmitted through the wireless interface 25 to the radiofrequency coupling 22. The radiofrequency coupling 22 transmits the signal to the measuring device 20. The measuring device 20 records the signal and measures certain parameters. The beginning of the recording and measurement by the measuring device 20 is triggered by the communication emulator 21. The measured parameters are transmitted from the measuring device 20 to the calibrator 24. The calibrator 24 checks if the parameters are within the specifications. In case the parameters are within the specifications the calibration process is finished and communication station 10 is marked okay. In case the parameters are not within the specifications the calibrator 24 calculate the appropriate calibration settings and adjusts the communication station 10. To check the success of the adjustment the calibration cycle is repeated. After a predefined number of calibration cycles that lead to remaining adjustments to the communication station 10 the communication station 10 is marked as detective and discarded.

The invention is not limited to the examples and especially not to certain communication protocols or modulation schemes. Furthermore alternative parameters can be measured for calibration purposes. The characteristics of the exemplary embodiments can be used in any combination.

The invention claimed is:

1. Method for calibrating a digital communication station, which uses an initial ranging procedure for measuring channel parameters in a communication channel, comprising:
   transmitting a signal to the communication station, which transfers the communication station into an initial ranging mode;
   measuring parameters of the signal transmitted by the communication station during the initial ranging cycle;

calculating necessary calibration adjustments to the communication station; and adjusting the communication station;

wherein after transmitting a signal to the communication station, which transfers the communication station into the initial ranging mode, no response to the signal transmitted by the communication station is issued causing the communication station to perform an entire initial ranging cycle, gradually increasing the transmitting power of the signal, despite the signal transmitted by the communication station having being received for measuring parameters, and wherein the initial ranging procedure is repeated to check the success of the adjustment and after a predetermined number of initial ranging procedures leading to remaining adjustments to the communication station the communication station is discarded.

2. Method according to claim 1, comprising:

repeating transmitting, measuring, calculating, and adjusting until the parameters of the signal transmitted by the communication station meet specified requirements or the communication station is discarded.

3. Method according to claim 1, wherein:

the measured parameters of the signal transmitted by the communication station are at least one of signal power, signal timing, and signal frequency.

4. Method according to claim 1, wherein:

the communication station is a mobile communication station.

5. Method according to claim 1, wherein:

the communication station is a WiMax communication station or a UMTS communication station.

6. Method according to claim 1, wherein:

the communication station is a GSM communication station.

7. Method according to claim 1, wherein:

the signal transmitted to the communication station that transfers the communication station into the initial ranging mode includes channel information setting at least one channel for the communication station to use for the initial ranging cycle.

8. Method according to claim 7, wherein:

the channel information includes at least one of a code, a frequency, and a timing.

9. Method according to claim 7, comprising:

repeatedly calibrating the communication station to calibrate a plurality of channels.

10. Method according to claim 1, wherein:

the signal transmitted to the communication station which transfers the communication station into the initial ranging mode controls parameters of the initial ranging mode.

11. Device for calibrating a digital communication station, which uses an initial ranging procedure for measuring channel parameters in a communication channel, comprising:

a communication emulator, measuring device, and calibrator, wherein:

the communication emulator transmits a signal to the communication station which transfers the communication station into an initial ranging mode, the measuring device measures parameters of the signal transmitted by the communication station during an initial ranging cycle, the calibrator calculates the necessary calibration adjustments to the communication station, the calibrator adjusts the communication station accordingly, and after transmitting a signal to the communication station the communication emulator transmits no response to the signal transmitted by the communication station causing the communication station to perform an entire initial ranging cycle, gradually increasing the transmitting power of the signal, despite the signal by the communication station having been received in the measurement device, wherein the initial ranging procedure is repeated to check the success of the adjustment and after a predetermined number of initial ranging procedures leading to remaining adjustments to the communication station the communication station is discarded by the calibrator.

12. Device according to claim 11, wherein:

the calibrator triggers the measuring device to repeat the calibration, if specified requirements are not met by the communication station after at least one calibration attempt, and after a predefined number of calibration attempts the communication station is discarded by the calibrator.

13. Device according to claim 11, wherein:

the parameters of the signal transmitted by the communication station and measured by the measuring device are at least one of the signal power, the signal timing, and the signal frequency.

14. Device according to claim 11, wherein:

the communication station is a mobile communication station.

15. Device according to claim 11, wherein:

the communication station is a WiMax communication station or a UMTS communication station.

16. Device according to claim 11, wherein:

the communication station is a GSM communication station.

17. Device according to claim 11, wherein:

the signal transmitted to the communication station by the communication emulator which transfers the communication station into the initial ranging mode includes channel information setting at least one channel for the communication station to use for the initial ranging cycle.

18. Device according to claim 17, wherein:

the channel information includes at least one of a code, a frequency, and a timing.

19. Device according to claim 17, wherein:

the calibrator triggers the measuring device to repeat the calibration for a plurality of different channels.

20. Device according to claim 11, wherein:

the signal transmitted by the communication emulator to the communication station which transfers the communication station into the initial ranging mode controls parameters of the initial ranging mode.

21. Device according to claim 11, wherein:

the device further comprises a radio frequency coupling connecting the communication station with the measuring device and the communication emulator.

* * * * *